Patented Mar. 7, 1950

2,499,393

UNITED STATES PATENT OFFICE 2,499,393

ESTERS OF α-ACYLOXYACRYLIC ACIDS

William O. Kenyon, Cornelius C. Unruh, and Thomas T. M. Laakso, Rochester, N. Y., assignors to Eastman Kodak Company, Rochester, N. Y., a corporation of New Jersey No Drawing. Application September 25, 1947, Serial No. 776,154

8 Claims. (Cl. 260—484)

This invention relates to a process for preparing esters of α-acyloxyacrylic acids.

Spence and Degering in U. S. Patent 2,407,302, dated September 10, 1946, have shown that esters of α-acyloxyacrylic acids may be prepared by reacting a ketene with a ketoester, such as ethyl pyruvate, however a reaction mixture which is difficult to separate into its component parts usually results. The products so prepared are obtained in low yields and are homopolymerized with extreme difficulty. In contradistinction thereto, the products prepared according to the process of the present invention are obtained in excellent yield and can be homopolymerized without difficulty.

It is, therefore, an object of our invention to provide a process for preparing esters of α-acyloxyacrylic acids.

A further object of our invention is to provide a process for preparing esters of α-acyloxyacrylic acids in increased yields and in condition suitable for polymerizing.

A still further object of our invention is to provide valuable new intermediates which can be used in the preparation of esters of α-acyloxyacrylic acids. Other objects will become apparent hereinafter from a consideration of the following description.

According to the process of our invention we react an ester of a β-halolactic acid with an acylating agent to produce an ester of an α-acyloxy-β-halopropionic acid, which is then dehydrohalogenated by heating with an organic tertiary amine to produce the desired ester of an α-acyloxyacrylic acid.

The β-halolactic acids which we can use in our process can be represented by the formula:

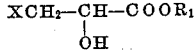

wherein $R_1$ represents a member selected from the group consisting of an alkyl group, such as methyl, ethyl, n-propyl, isopropyl, n-butyl, isobutyl, etc., (i. e. an alkyl group having the formula $C_nH_{2n+1}$ where $n$ is a positive integer from 1 to 4), and an aralkyl group, such as benzyl, β-phenylethyl, β-phenylpropyl, β-phenylbutyl (i. e. mononuclear aralkyl group having 7 to 10 carbon atoms), and X represents a halogen atom, such as chlorine, bromine, etc. Typical are methyl β-chlorolactate, ethyl β-chlorolactate, n-propyl β-chlorolactate, isopropyl β-chlorolactate, n-butyl β-chlorolactate, isobutyl β-chlorolactate, benzyl β-chlorolactate, methyl β-bromolactate, n-butyl β-bromolactate, etc.

The acylating agents which we use are the anhydrides or acid halides of acids having the formula:

wherein R represents a member selected from the group consisting of an alkyl group, such as methyl, ethyl, n-propyl, isopropyl (i. e. an alkyl group having the formula $C_nH_{2n+1}$ where $n$ is a positive integer from 1 to 3) and an aryl group, such as phenyl, o-, m-, and p-tolyl (i. e. a mononuclear aryl group of the benzene series having 6 to 7 carbon atoms). Typical are: acetic anhydride, acetyl chloride, propionic anhydride, propionyl chloride, n-butyric anhydride, isobutyric anhydride, n-butyryl chloride, isobutyryl chloride, benzoic anhydride, benzoyl chloride, etc. Other acylating agents, such as the ketenes (e. g. ketene, methyl ketene, etc.) can be used, although there is usually no advantage in using them.

After acylation of the β-halolactate ester, the α-acyloxy-β-halopropionate ester can be separated from the reaction mixture and then purified by distillation in a vacuum, if desired. Advantageously we can add an organic tertiary amine to the reaction mixture resulting from the acylation, and heat the mixture under reflux. The tertiary amines which we can use are the aliphatic amines, such as trimethylamine, triethylamine, tri-n-propylamine, tri-n-butylamine, etc.; the aromatic amines, such as N,N-dimethylaniline, N,N-diethylaniline, etc.; and the heterocyclic amines, such as pyridine, quinoline, etc.

The following equations will serve to show the mechanism of our process:

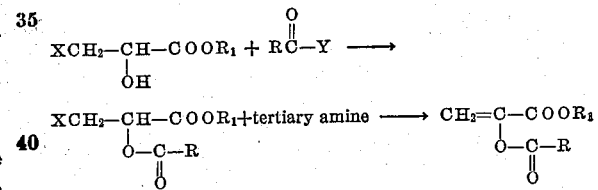

wherein R, $R_1$, and X have the above designated definition and Y stands for a halogen atom or a RCOO— group.

Since a number of the β-halolactates which we can use as starting materials are not described in the literature, the following examples will serve to illustrate the manner in which these substances can be prepared:

Example I.—Methyl β-chlorolactate 1525 gms. (10 mols) of β-chlorolactic acid and 3050 gms. (95 mols) of absolute methanol were placed in a glass vessel and 4% by weight of anhydrous hydrogen chloride added. The solution was then refluxed for 20 hours, at the end of which time the excess methanol was removed under vacuum, and the residue fractionally distilled. A yield of 505 gms. of methyl β-chlorolactate boiling at 80–80.5° C./9 mm. was obtained. The melting point of the ester was found to be 18–21° C. Analysis was as follows:

|    | Calculated | Found |
|----|------------|-------|
| C  | 34.67      | 34.64 |
| H  | 5.07       | 5.11  |
| Cl | 25.63      | 25.71 |

Example II.—Isobutyl β-chlorolactate 996 gms. (8 mols) of β-chlorolactic acid and 2000 gms. (27 mols) of isobutyl alcohol were placed in a glass vessel and 4% by weight of anhydrous hydrogen chloride passed in. The solution was then refluxed for 20 hours, and the excess isobutyl alcohol removed under vacuum. The residue was then fractionally distilled, and isobutyl β-chlorolactate boiling at 76–77° C./2.5 mm. was obtained. The distillate gradually solidified, and the melting point was observed to be 25–27° C. Analysis was as follows:

|    | Calculated | Found |
|----|------------|-------|
| C  | 46.55      | 47.28 |
| H  | 7.20       | 7.38  |
| Cl | 19.67      | 19.07 |

Example III.—n-Butyl β-chlorolactate 996 gms. (8 mols) of β-chlorolactic acid and 200 gms. (27 mols) of n-butanol were placed in a glass vessel and 4% by weight of dry hydrogen chloride gas passed in. The solution was then refluxed for 20 hours, and the excess n-butanol removed under vacuum. The residue was fractionally distilled, and an 85% yield of n-butyl β-chlorolactate boiling at 118–119° C/16 mm. was obtained. Analysis was as follows:

|    | Calculated | Found |
|----|------------|-------|
| C  | 46.60      | 46.03 |
| H  | 7.20       | 7.60  |
| Cl | 19.60      | 19.15 |

The ethyl ester of β-chlorolactic acid was described by C. F. Koelsch in the "Journal of the American Chemical Society," vol. 52 (1930), pages 1105–1106. Koelsch also described the preparation of β-chlorolactic acid, oxidizing glycerol chlorohydrin to the acid. By substituting molecularly equivalent amounts of other alcohols in the above example, other esters of β-chlorolactic acid can be prepared. For example, benzyl alcohol can replace the methanol of Example I to produce benzyl β-chlorolactate having the formula:

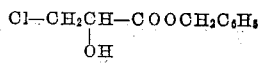

In a similar manner n-propanol and isopropanol can replace the n-butanol or isobutanol of Examples II and III to produce β-chlorolactic acid esters of these alcohols.

The following examples demonstrate the method whereby we prepare our esters of α-acyloxyacrylic acids.

Example IV.—Methyl α-acetoxyacrylate

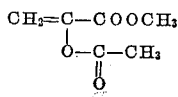

Acetylation

The methyl α-chlorolactate produced in Example I (505 gms. or 3.63 mols) was added to 1110 gms. (10.89 mols) of acetic anhydride and the mixture boiled under reflux for 20 hours. After fractionation under vacuum, a 77% yield of methyl α-acetoxy-β-chloropropionate, boiling at 92.8 to 93.5° C./9 mm., was obtained. The analysis of the produced ester was as follows:

|    | Calculated | Found |
|----|------------|-------|
| C  | 39.90      | 40.13 |
| H  | 4.98       | 5.04  |
| Cl | 19.67      | 21.15 |

Dehydrochlorination 330 gms. (1.83 mols) of the methyl α-acetoxy-β-chloropropionate prepared above, 284 gms. (2.2 mols) of quinoline, and 1000 cc. of dry thiophene-free benzene were stirred under reflux for 20 hours. The benzene was then concentrated, and the residual oil fractionated under vacuum. A 40% yield of methyl α-acetoxyacrylate boiling at 63–64° C./10 mm. was obtained. The ester was then purified by dissolving in thiophene-free benzene, washing with ice-cold 2% sulfuric acid, followed by washing with ice-cold water and cold 2% sodium carbonate solution, drying the benzene layer, and finally concentrating the benzene layer and fractionally distilling as before. The analysis was as follows:

|    | Calculated | Found |
|----|------------|-------|
| C  | 50.00      | 50.28 |
| H  | 5.56       | 5.52  |

Example V.—Ethyl α-acetoxyacrylate

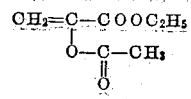

Acetylation

A mixture of 100 gms. (0.65 mol) of ethyl β-chlorolactate (M. P. 35–37° C.) and 310 gms. (3 mols) of acetic anhydride was heated on a steam bath for 20 hours. The reaction mixture was then fractionated under vacuum, and after two distillations a cut, B. P. 68.5–69° C./1 mm., was obtained, representing a 90.2% yield (115 gms.) of ethyl α-acetoxy-β-chloropropionate. The analysis was as follows:

|        | Calculated | Found |
|--------|------------|-------|
| C      | 43.13      | 43.08 |
| H      | 5.66       | 5.40  |
| Cl     | 18.25      | 18.10 |
| Acetyl | 22.10      | 22.30 |

Dehydrochlorination 250 gms. (1.29 mols) of ethyl α-acetoxy-β-chloropropionate, prepared as above, 200 gms. (1.55 mols) of quinoline, and 1000 cc. of dry thiophene-free benzene were stirred under reflux for 20 hours. The benzene was then concentrated and the residual oil fractionated under vacuum. A 94% yield (191 gms.) of ethyl α-acetoxyacrylate containing a trace of quinoline was obtained (B. P. 99–100° C./135 mm.). This ester was then dissolved in thiophene-free benzene and purified by washing with ice-cold 2% sulfuric acid, followed by washings with cold water and cold 2% sodium carbonate solution. After drying, the benzene layer was concentrated, and the residual oil fractionated under vacuum. The following analysis was found for the purified monomer:

|   | Calculated | Found |
|---|---|---|
| C | 53.16 | 52.49 |
| N | 6.32 | 6.37 |

EXAMPLE VI.—ETHYL α-BUTYROXYACRYLATE

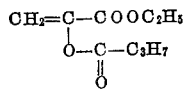

Acylation 715 gms. (5 mols) of ethyl β-chlorolactate and 2070 gms. (13 mols) of n-butyric anhydride were heated on a steam bath for 20 hours. The reaction mixture was then fractionated under vacuum, and a cut, B. P. 113–114° C./7 mm., of ethyl α-butyroxy-β-chlorolactate was obtained in 55.7% yield (620 gms.). Analysis was as follows:

|   | Calculated | Found |
|---|---|---|
| C | 48.50 | 49.16 |
| H | 6.74 | 6.88 |
| Cl | 16.60 | 16.45 |

Dehydrochlorination 620 gms. (2.7 mols) of the ester prepared above, 403 gms. (3.2 mols) of quinoline, and 1000 cc. of dry thiophene-free benzene were stirred under reflux for 20 hours. The benzene was then concentrated, and the residual oil fractionated under vacuum. A 60% yield of ethyl α-butyroxyacrylate, B. P. 95–96° C./11 mm., was obtained having the following analysis.

|   | Calculated | Found |
|---|---|---|
| C | 58.06 | 58.47 |
| H | 7.52 | 6.96 |

By substituting a molecularly equivalent amount of benzyl β-chlorlactate in the above example, benzyl α-butyroxyacrylate having the formula:

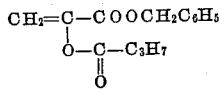

can be prepared in 70–75% yield.

EXAMPLE VII.—ISOBUTYL α-ACETOXYACRYLATE

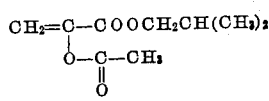

Acetylation 1250 gms. (6.96 mols) of isobutyl β-chlorolactate, prepared as above, and 2150 gms. (21 mols) of acetic anhydride were heated on a steam bath for 20 hours. The reaction mixture was then fractionated under vacuum and a 91% yield of isobutyl α-acetoxy-β-chloropropionate, B. P. 117–117.5°/8 mm., was obtained. Analysis was as follows:

|   | Calculated | Found |
|---|---|---|
| C | 48.55 | 48.88 |
| H | 6.74 | 6.82 |
| Cl | 15.97 | 16.26 |

Dehydrochlorination 1425 gms. (6.4 mols) of the above ester, 1010 gms. (7.8 mols) of quinoline and 2000 cc. of dry thiophene-free benzene were heated under reflux for 20 hours. The benzene layer was concentrated, and the residual oil fractionated under vacuum. A 54.6% yield of isobutyl α-acetoxyacrylate, B. P. 110.5–111° C./22 mm., was obtained. This ester was further purified by dissolving in thiophene-free benzene, washing with ice-cold 2% sulfuric acid, followed by washings with cold water and cold sodium carbonate solution. The benzene layer was then dried, concentrated under vacuum, and finally fractionally distilled under vacuum to give a pure isobutyl α-acetoxyacrylate. Analysis was as follows:

|   | Calculated | Found |
|---|---|---|
| C | 58.06 | 57.79 |
| H | 7.52 | 7.55 |

EXAMPLE VIII.—N-BUTYL α-ACETOXYACRYLATE

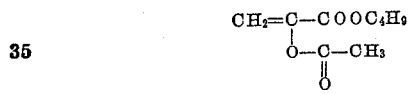

Acetylation 1230 gms. (6.8 mols) of n-butyl β-chlorolactate, prepared as above, and 1985 gms. (20.4 mols) of acetic anhydride were heated on a steam bath for 20 hours. The reaction mixture was then fractionated under vacuum and an 87–90% yield of n-butyl α-acetoxy-β-chloropropionate, B. P. 130–131° C./12 mm. was obtained. Analysis was as follows:

|   | Calculated | Found |
|---|---|---|
| C | 48.55 | 49.51 |
| H | 6.74 | 6.77 |
| Cl | 15.97 | 15.03 |

Dehydrochlorination 1510 gms. (6.78 mols) of the above ester, 1060 gms. (8.2 mols) of quinoline, and 2000 cc. of toluene were heated under reflux for 20 hours. The toluene layer was concentrated, and the residual oil fractionated under vacuum. A 52% yield of n-butyl α-acetoxyacrylate, B. P. 105–106.5° C./15 mm., was obtained. The ester was then purified by dissolving in toluene, and washing with 2% sulfuric acid, water, and 2% sodium carbonate solution as described above. Analysis was as follows:

|   | Calculated | Found |
|---|---|---|
| C | 58.06 | 58.16 |
| H | 7.52 | 7.77 |

By substituting benzyl β-chlorolactate in a molecularly equivalent amount in the above example, benzyl α-acetoxyacrylate can be prepared.

Example IX.—Ethyl α-benzoxyacrylate

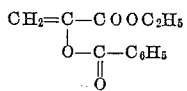

Benzoylation 762.5 gms. (5 mols) of ethyl β-chlorolactate and 702.8 gms. (5 mols) of benzoyl chloride were heated under reflux for 20 hours. The reaction mixture was fractionated and a 40% yield (520 gms.) of ethyl α-benzoxy-β-chloropropionate, B. P. 183–186° C. /15 mm., was obtained. The ester was cooler to −15° C. but no crystals formed. Analysis was as follows:

|    | Calculated | Found |
|----|------------|-------|
| C  | 56.14      | 56.24 |
| H  | 5.06       | 5.10  |
| Cl | 13.84      | 13.90 |

Dehydrochlorination 520 gms. (2.02 mols) of ethyl α-benzoxy-β-chloropropionate, 340 gms. (2.63 mols) of quinoline, and 500 cc. of toluene were stirred under reflux for 20 hours. The reaction mixture was fractionated, and a 49.6% yield (173 gms.) of ethyl α-benzoxyacrylate, B. P. 118-119° C. /0.5 mm. was obtained. The ester was then purified by dissolving in toluene, washing with 2% ice-cold sulfuric acid, followed by washings with cold water, and cold 2% sodium carbonate. The toluene layer was then dried, concentrated by heating under a vacuum, and finally fractionally distilled under a vacuum. Analysis was as follows:

|    | Calculated | Found |
|----|------------|-------|
| C  | 64.90      | 64.01 |
| H  | 5.40       | 5.24  |

By substituting a molecularly equivalent amount of propionyl chloride in the above example, ethyl α-propionoxyacrylate can be prepared.

The esters prepared as described above can be homopolymerized or polymerized with another unsaturated compound with ease. The velocity of the polymerization can be accelerated to a considerable extent by heating, or by the use of polymerization catalysts which are known to accelerate the polymerization of vinyl-type compounds. Such catalysts are the organic peroxides (e. g. benzoyl peroxide, acetyl benzoyl, acetyl benzoyl peroxide, lauroyl peroxide, oleoyl peroxide, etc.), hydrogen peroxides, perborates (e. g. sodium and potassium perborates), and persulfates (e. g. sodium, potassium, and ammonium persulfates).

Although elevated temperatures can advantageously be used, we can use temperatures varying from ordinary room temperature (20–25° C.) to approximately 60–65° C. Higher temperatures can be used, however, the above range is usually adequate. The polymerization can also be carried out by the bead or emulsion method in which water or some other medium in which the monomers are insoluble is employed as a dispersing medium, with or without emulsifying agents. The polymerizations can also be performed by use of a solvent which dissolves the monomer, but not the polymer, which precipitates from the solution as it forms. Alternatively, the diluent or solvent, such as benzene, toluene, xylene, etc., can be a solvent for the polymer. The emulsion method of polymerization has been found to be particularly advantageous, since the rate of polymerization and form of polymer can be easily controlled.

The esters prepared in accordance with our invention can either be homopolymerized or copolymerized with another unsaturated compound containing a $$CH_2=C<$$

group. The following examples will illustrate the manner in which we prepare polymers from our α-acyloxyacrylic esters.

Example X.—Homopolymer of ethyl α-acetoxyacrylate

The ester prepared in Example V above was polymerized by heating at 50° C. in the presence of 0.1% benzoyl peroxide as a polymerization catalyst. A clear, hard mass of polymer was obtained which had the following analysis:

|    | Calculated | Found |
|----|------------|-------|
| C  | 53.16      | 53.51 |
| H  | 6.32       | 6.54  |

A molecularly equivalent amount of ethyl α-propionoxyacrylate can be substituted in the above example, a hard, tough homopolymer being obtained.

Example XI.—Homopolymer of ethyl α-benzoxyacrylate 173 gms. of ethyl α-benzoxyacrylate were homopolymerized by heating with 0.1% benzoyl peroxide at 50° C. A clear, hard resin having the following analysis was formed:

|    | Calculated | Found |
|----|------------|-------|
| C  | 64.90      | 64.42 |
| H  | 5.40       | 5.37  |

A molecularly equivalent amount of n-butyl α-benzoxyacrylate can be substituted in the above example, a hard polymer suitable for molding being obtained.

Example XII.—Homopolymer of methyl α-acetoxyacrylate 5 gms. of methyl α-acetoxyacrylate and 0.1% of benzoyl peroxide were heated on a water bath for 20 hours at 50° C. A clear, colorless, hard homopolymer was obtained.

A molecularly equivalent amount of benzyl α-acetoxyacrylate can be substituted in the above example to advantage.

Example XIII.—Homopolymer of ethyl α-acetoxyacrylate

A solution of 70 gms. of ethyl α-acetoxyacrylate, 70 gms. of 1,4-dioxane, and 0.350 gm. of benzoyl peroxide was placed in a sealed glass tube under an atmosphere of nitrogen, and the tube placed in a constant temperature bath maintained at 50° C. After heating for 48 hours a product which was sufficiently viscous that it did not flow at 50° C. was obtained. This product was then dissolved in hot 1,4-dioxane and the viscous solution poured into a large excess of well-stirred methanol. The resulting fibrous precipitate was then leached 2 to 3 times with fresh methanol, and then dried at 50° C. in vacuo. Analysis was as follows:

|   | Calculated | Found |
|---|---|---|
| C | 53.17 | 52.41 |
| H | 6.33 | 5.87 |

EXAMPLE XIV.—HOMOPOLYMER OF ETHYL α-ACETOXYACRYLATE 15.8 gms. of ethyl α-acetoxyacrylate and 0.08 gm. of benzoyl peroxide (no solvent) were placed in a sealed tube under an atmosphere of nitrogen and the tube placed in a constant temperature bath maintained at 50° C. (± 1° C.). After heating for 15 hours, a hard, clear resin had formed in the tube.

EXAMPLE XV.—EMULSION HOMOPOLYMERIZATION OF ETHYL α-ACETOXYACRYLATE

A solution of 1.20 gms. of high grade gum arabic in 600 cc. of distilled water was placed in a one-quart, glass-topped fruit jar. A solution of 0.5 gm. of benzoyl peroxide in 200 gms. of ethyl α-acetoxyacrylate was then added, and the jar tumbled end over end in a 50° C. constant temperature water bath at about 16 R. P. M. After 20 hours the product was filtered, and the resulting beads were thoroughly washed with distilled water, and then dried at 50° C. in vacuo. A yield of 16.6 gms. of clear, hard beads of homopolymer was obtained.

EXAMPLE XVI.—EMULSION HOMOPOLYMERIZATION OF ETHYL α-ACETOXYACRYLATE 200 gms. of ethyl α-acetoxyacrylate, 50 gms. of dibutyl phthalate, and 0.5 gm. of benzoyl peroxide were shaken until the catalyst was in solution. This solution was then added to a solution of 1.2 gms. of gum arabic in 600 cc. of distilled water which was contained in a quart fruit jar with a clear rubber seal. The jar was then placed in a constant temperature bath maintained at 50° C. (±1° C.) and tumbled end over end for 20 hours at 16 R. P. M. The resulting hard, white beads were washed by decantation until the wash waters were clear. After a final washing the product was dried in an enamel tray at room temperature. The yield of polymer was 195.5 gms.

EXAMPLE XVII.—HOMOPOLYMERIZATION OF ETHYL α-BUTYROXYACRYLATE 40 gms. of ethyl α-butyroxyacrylate and 0.1 gm. of benzoyl peroxide were mixed, and then shaken until a clear solution was formed. This solution was added with stirring to a solution of 0.24 gm. of gum arabic in 120 gms. of distilled water contained in a magnesium citrate bottle. The bottle was placed in a constant temperature bath maintained at 50° C. and tumbled end over end for 20 hours at 16 R. P. M. The resulting hard, white beads were washed by decantation until the wash water was clear, and then dried first at room temperature, followed by a 20-hour drying in a vacuum oven. The yield was 37.5 gms.

EXAMPLE XVIII.—HOMOPOLYMERIZATION OF ISOBUTYL α-ACETOXYACRYLATE 40 gms. of isobutyl α-acetoxyacrylate and 0.1 gm. of benzoyl peroxide were mixed and shaken until a clear solution was obtained. This solution was then poured into a solution of 0.24 gm. of gum arabic in 120 gms. of distilled water contained in a magnesium citrate bottle. The bottle was placed in a constant temperature bath maintained at 50° C. (±1° C.) and tumbled end over end for 20 hours at 16 R. P. M. The resulting hard, white beads were washed by decantation until the wash waters were clear, then dried first at room temperature, followed by a 20-hour drying in a vacuum oven. A yield of 38 gms. of polymer was obtained.

EXAMPLE XIX.—HOMOPOLYMERIZATION OF METHYL α-ACETOXYACRYLATE

A solution of 85 gms. of methyl α-acetoxyacrylate, 85 cc. 1,4-dioxane, and 0.22 gm. of benzoyl peroxide were placed in a sealed glass tube under an atmosphere of nitrogen, and the tube placed in a constant temperature water bath maintained at 50° C. After 20 hours a viscous, non-flowing mass had formed which was dispersed in hot dioxane. This was then poured into a large excess of methanol, and the white precipitate washed with first methanol. After drying at 55° C. a yield of 65 gms. of the polymer was obtained.

EXMPLE XX.—HOMOPOLYMERIZATION OF ETHYL α-BUTYROXYACRYLATE 5 gms. of ethyl α-butyroxyacrylate and 0.5 gm. of benzoyl peroxide were shaken until a clear solution was formed. After heating the solution for 20 hours on a constant temperature bath maintained at 50° C., a clear, colorless, hard homopolymer was obtained.

EXAMPLE XXI.—HOMOPOLYMERIZATION OF ISOBUTYL α-ACETOXYACRYLATE

A solution of 5 gms. of isobutyl α-acetoxyacrylate and 0.5 gm. of benzoyl peroxide was placed in a constant temperature bath maintained at 50° C. and polymerized by heating for 20 hours. A clear, colorless, hard polymer was obtained which exhibited excellent molding properties.

EXAMPLE XXII.—HOMOPOLYMERIZATION OF N-BUTYL α-ACETOXYACRYLATE 5 gms. of n-butyl α-acetoxyacrylate and 0.5 gm. of benzoyl peroxide were mixed and shaken until clear solution was obtained. The solution was then placed in a constant temperature bath maintained at 50° C. and polymerized by heating for 20 hours. The resulting homopolymer was clear, colorless, and hard, and was found to be suitable for molding.

EXAMPLE XXIII.—COPOLYMER OF ETHYL α-BUTYROXYACRYLATE AND ETHYL α-ACETOXYACRYLATE 9.3 gms. of ethyl α-butyroxyacrylate, 7.9 gms. of ethyl α-acetoxyacrylate, and 0.086 gm. of benzoyl peroxide were placed in a sealed glass tube under an atmosphere of nitrogen, and the tube placed in a constant temperature water bath maintained at 50° C. After 16 hours a hard, clear polymer was obtained.

EXAMPLE XXIV.—COPOLYMER OF ISOBUTYL α-ACETOXYACRYLATE AND ETHYL α-ACETOXYACRYLATE 9.3 gms. of isobutyl α-acetoxyacrylate, 7.9 gms. of ethyl α-acetoxycrylate, and 0.086 gm. of benzoyl peroxide were placed in a sealed tube under an atmosphere of nitrogen, and the tube placed in a constant temperature water bath maintained at 50° C. After 16 hours a clear, colorless, hard resin was formed.

EXAMPLE XXV.—COPOLYMER OF METHYL α-METHACRYLATE AND ETHYL α-ACETOXYACRYLATE 15.8 gms. of ethyl α-acetoxyacrylate, 10.0 gms. of methyl α-methacrylate, and 0.13 gm. of benzoyl peroxide were placed in a sealed glass tube under an atmosphere of nitrogen and the tube placed in a constant temperature water bath maintained at 50° C. After three days a clear, hard resin was formed, which was dissolved in acetone. This solution was then poured into an excess of methanol, the resulting precipitate redissolved in acetone, and the resulting solution poured into hot water. After drying the reprecipitated product at 50° C., a yield of 24 gms. of copolymer was obtained. The acetyl content of the copolymer was found by distillation to be 14.7%, representing a molar ratio of methyl α-methacrylate to ethyl α-acetoxyacrylate of approximately 1.5:1 in the copolymer.

EXAMPLE XXVI.—COPOLYMER OF STYRENE AND ETHYL α-ACETOXYACRYLATE 15.8 gms. of ethyl α-acetoxyacrylate, 10.4 gms. of styrene, and 0.13 gm. of benzoyl peroxide were placed in a sealed ampoule under an atmosphere of nitrogen. The ampoule was placed in a constant temperature bath maintained at 50° C., and after 6 days a hard, clear resin was formed. This was dissolved in 1,4-dioxane, the solution poured into an excess of stirred methanol. The precipitate was again dissolved in 1,4-dioxane, and the solution poured into an excess of hot water. After the resulting precipitate was dried at 50° C., a yield of 24 gms. of copolymer was obtained. The ethoxyl ($C_2H_5O-$) content of the copolymer was found to be 16.6%, indicating a molar ratio of styrene to the ethyl α-acetoxyacrylate of approximately 1.1:1 in the copolymer.

By substituting a molecularly equivalent amount of p-methylstyrene in the above example, a copolymer suitable for molding can be obtained.

EXAMPLE XXVII.—COPOLYMER OF METHYL α-METHACRYLATE AND ETHYL α-BUTYROXYACRYLATE 9.3 gms. of ethyl α-butyroxyacrylate, 5.0 gms. of methyl α-methacrylate, and 0.072 gm. of benzoyl peroxide were sealed together in a glass ampoule under an atmosphere of nitrogen. The ampoule was then placed in a constant temperature bath maintained at 50° C. After 3 days a clear, colorless, hard resin was formed.

By substituting a molecularly equivalent amount of n-butyl α-methacrylate or diisopropyl fumarate in the above example, other valuable copolymers can be prepared.

EXAMPLE XXVIII.—COPOLYMER OF STYRENE AND ETHYL α-BUTYROXYACRYLATE 9.3 gms. of ethyl α-butyroxyacrylate, 5.2 gms. of styrene, and 0.072 gm. of benzoyl peroxide were sealed together in a glass tube under an atmosphere of nitrogen. The tube was placed in a constant temperature bath maintained at 50° C. After 7 days a clear, colorless, and hard resin was formed.

EXAMPLE XXIX.—COPOLYMER OF STYRENE AND ISOBUTYL α-ACETOXYACRYLATE 9.3 gms. of isobutyl α-acetoxyacrylate, 5.2 gms. of styrene, and 0.072 gm. of benzoyl peroxide were placed in a sealed glass tube under an atmosphere of nitrogen. The tube was placed in a constant temperature bath maintained at 50° C. After 7 days a clear, colorless, and hard resin had formed.

EXAMPLE XXX.—COPOLYMER OF METHYL α-METHACRYLATE AND ISOBUTYL α-ACETOXYACRYLATE 9.3 gms. of isobutyl α-acetoxyacrylate, 5.0 gms. of methyl α-methacrylate, and 0.072 gm. of benzoyl peroxide were sealed together in a glass ampoule under an atmosphere of nitrogen and placed in a 50° C. bath maintained at constant temperature. After 3 days a clear, colorless, and hard resin was formed.

By substituting a molecularly equivalent amount of methyl vinyl ketone, methyl isopropenyl ketone, or vinyl acetate in the above example, other copolymers suitable for molding can be obtained.

EXAMPLE XXXI.—POLYMER OF ETHYL α-ACETOXYACRYLATE

A solution of 0.25 gm. of benzoyl peroxide in 250 cc. of ethyl α-acetoxyacrylate was poured into a glass cell, whose inside dimensions were 8" x 6" x ¼", until the cell was almost full. The cell was then covered with a glass plate, and the cell set in a 60° C. oven maintained at constant temperature. After 16 hours the monomer had polymerized to a solid, but heating was continued for an additional day. On removal from the cell there was obtained a clear, colorless plate of excellent physical properties.

Other unsaturated compounds can be used to advantage in the above examples. For example, methyl acrylate, n-butyl acrylate, etc., are excellently suited for forming copolymers with the α-acryloxyacrylates of our invention.

We claim:

1. A process for preparing an ester of an α-acyloxyacrylic acid which comprises reacting an ester represented by the formula:

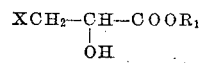

wherein $R_1$ represents a member selected from the group consisting of an alkyl group having the formula $C_nH_{2n+1}$ wherein $n$ is a positive integer from 1 to 4, and a mononuclear aralkyl group having 7 to 10 carbon atoms, and X is a halogen atom selected from the group consisting of chlorine and bromine atoms, with a member selected from the group consisting of anhydrides and acid halides of an acid represented by the formula:

wherein R represents a member selected from the group consisting of an alkyl group having 1 to 3 carbon atoms and an aryl group having 6 to 7 carbon atoms, and dehydrohalogenating the formed ester of an α-acyloxy-β-halopropionic acid by heating with an organic tertiary amine.

2. A process for preparing methyl α-acetoxyacrylate which comprises reacting methyl β-chlorolactate with acetic anhydride and dehydrochlorinating the formed methyl α-acetoxy-β-halopropionate by heating with an organic tertiary amine.

3. A process for preparing an ester of an α-acyloxyacrylic acid which comprises dehydrohalogenating an ester represented by the formula:

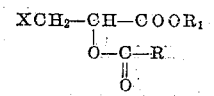

wherein R represents a member selected from the group consisting of an alkyl group having 1 to 3 carbon atoms, and an aryl group having 6 to 7 carbon atoms, $R_1$ represents a member selected from the group consisting an alkyl group having the formula $C_nH_{2n+1}$, wherein $n$ is a positive integer from 1 to 4, and a mononuclear aralkyl group having 7 to 10 carbon atoms, and X represents a halogen atom selected from the group consisting of chlorine and bromine atoms, by heating said ester with an organic tertiary amine.

4. A process for preparing methyl α-acetoxyacrylate which comprises reacting methyl β-chlorolactate with acetic anhydride and dehydrochlorinating the formed α-acetoxy-β-chlorpropionate by heating with quinoline.

5. A process for preparing n-butyl α-acetoxyacrylate which comprises reacting n-butyl α-chlorolactate with acetic anhydride and dehydrochlorinating the formed n-butyl α-acetoxy-β-chlorpropionate by heating with an organic tertiary amine.

6. A process for preparing n-butyl α-acetoxyacrylate which comprises reacting n-butyl β-chlorolactate with acetic anhydride and dehydrochlorinating the formed n-butyl α-acetoxy-β-chlorpropionate by heating with quinoline.

7. A process for preparing methyl α-acetoxyacrylate which comprises dehydrochlorinating methyl α-acetoxy-β-chlorpropionate by heating the said methyl α-acetoxy-β-chlorpropionate with an organic tertiary amine.

8. A process for preparing methyl α-acetoxyacrylate which comprises dehydrochlorinating methyl α-acetoxy-β-chlorpropionate by heating the said methyl α-acetoxy-β-chlorpropionate with quinoline.

WILLIAM O. KENYON.
CORNELIUS C. UNRUH.
THOMAS T. M. LAAKSO.

No references cited.

Certificate of Correction

Patent No. 2,499,393 — March 7, 1950

WILLIAM O. KENYON ET AL.

It is hereby certified that errors appear in the printed specification of the above numbered patent requiring correction as follows:

Column 3, line 61, for the word "example" read *examples*; column 5, line 24, for "(13 mols)" read *(13+ mols)*; column 7, line 14, for "cooler" read *cooled*; column 13, lines 7 and 8, for "α-chlorolactate" read *β-chlorolactate*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*